United States Patent [19]
Tharman

[11] 3,778,650
[45] Dec. 11, 1973

[54] BATTERY CHARGING REGULATOR-RECTIFIER MODULE

[75] Inventor: Paul A. Tharman, Milwaukee, Wis.

[73] Assignee: Briggs & Stratton Corporation, Wauwatosa, Wis.

[22] Filed: Oct. 10, 1972

[21] Appl. No.: 296,084

[52] U.S. Cl............ 310/68 D, 174/DIG. 5, 317/100
[51] Int. Cl................................................. H01l 1/12
[58] Field of Search.................. 310/68 D; 317/100, 317/101 D; 174/DIG. 5, 15 R

[56] References Cited
UNITED STATES PATENTS

| | | | |
|---|---|---|---|
| 3,538,362 | 11/1970 | Cheetham et al................ | 310/68 D |
| 3,638,073 | 1/1972 | Bernstein...................... | 174/DIG. 5 |
| 3,697,814 | 10/1972 | Christman et al. ................. | 317/100 |

Primary Examiner—J. D. Miller
Assistant Examiner—Robert J. Hickey
Attorney—Ira Milton Jones

[57] ABSTRACT

A power diode and an SCR are secured in snug bores in a metal holder that serves as heat sink and electrical connector. One terminal element of a plug connector is crimped directly to the anode terminal of the diode, thus enabling the whole plug to be fixed relative to the holder before the holder with attached compoents is inserted into a container that is filled with potting material. Leads of components are crimp connected directly to one another.

3 Claims, 4 Drawing Figures

BATTERY CHARGING REGULATOR-RECTIFIER MODULE

This invention relates to regulator-rectifier modules for electrical systems, by which current from an alternator is regulated and rectified for the charging of a storage battery and energization of a load; and the invention is more particularly concerned with a sturdy, compact and inexpensive structure comprising such a module.

The general principles of the module of the present invention are disclosed in the copending application of P. A. Tharman Ser. No. 280,940, filed Aug. 16, 1972. In turn, that module embodies features of a circuit disclosed in the copending application of J. R. Harkness, Ser. No. 229,891, filed Feb. 28, 1972. Reference may be made to those applications for a more complete description of the circuitry and the functioning of the module of this invention.

Ordinarily the primal current source for an electrical system comprising the module of this invention is an engine driven alternator, although it could as well be any other a.c. source such as a transformer secondary.

Briefly, the module comprises an SCR and a power diode that are connected to conduct alternately, that is, the power diode conducts one phase of a.c., and the SCR can conduct a.c. of the opposite phase. A resistance-zener diode regulating circuit provides a reference voltage source that is connected with the gate of the SCR to render the SCR conductive in accordance with the charging requirements of a storage battery connected with the module.

When a single such module is used in an electrical system, a four-terminal connector plug that also comprises a part of the module has two of its terminals connected with the a.c. source, another one connectable with a load (e.g., lights), and the fourth connected with the storage battery. The load, the battery and the module have a common ground. The battery is charged on the a.c. half-cycles passed by the SCR, which is gated "on" by means of the resistor-zener diode circuit in accordance with charging requirements of the battery. When power is available from the a.c. source, the load can be energized, through manually controllable switch means, with a.c. half-cycles of the phase passed by the power diode; and when the alternator is not operating the load can be energized with d.c. from the battery.

For an electrical system with higher power requirements, two such modules can be connected with one another and with alternator and battery terminals by means of a simple harness comprising three plug connectors that are wired to one another. The dual-module arrangement enables full-wave rectified current from the alternator to be used for both regulated battery charging and load energization.

Modules of this type are especially useful in the electrical systems of vehicles and equipment powered by single-cylinder gasoline engines. Such vehicles and equipment must often operate under severely adverse conditions. For example, on a hot summer day a small riding tractor may be used for mowing or soil tilling, possibly in a very dusty environment; and a few months later the same machine may be used for plowing snow in blizzard conditions. Obviously the electrical system and every part of it must survive the extremes of temperature, environmental conditions and vibration that attend such operations, and should be able to do so with an absolute minimum of maintenance, preferably none. Furthermore, the very fact that the equipment is powered by a single-cylinder engine imposes a stringent requirement for compactness. Nevertheless, intense competition in the field of small engines and the equipment powered by such engines dictates that in meeting these requirements costs be kept to rock-bottom minimums.

The general object of the present invention is to provide a regulator-rectifier module of the above-described character that very satisfactorily meets the requirements for sturdiness, dependability, compactness and low cost.

Another object of this invention is to provide a module of the character described that takes fullest advantage of the connection terminals conventionally present on such electronic components as diodes, resistors and the like to achieve the utmost compactness and sturdiness in component-to-component connections, and which also takes fullest advantage of a heat sink necessarily provided for the power diode and the SCR of the module by utilizing that heat sink as a base or chassis upon which all components of the module are supported prior to encapsulation of the module.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
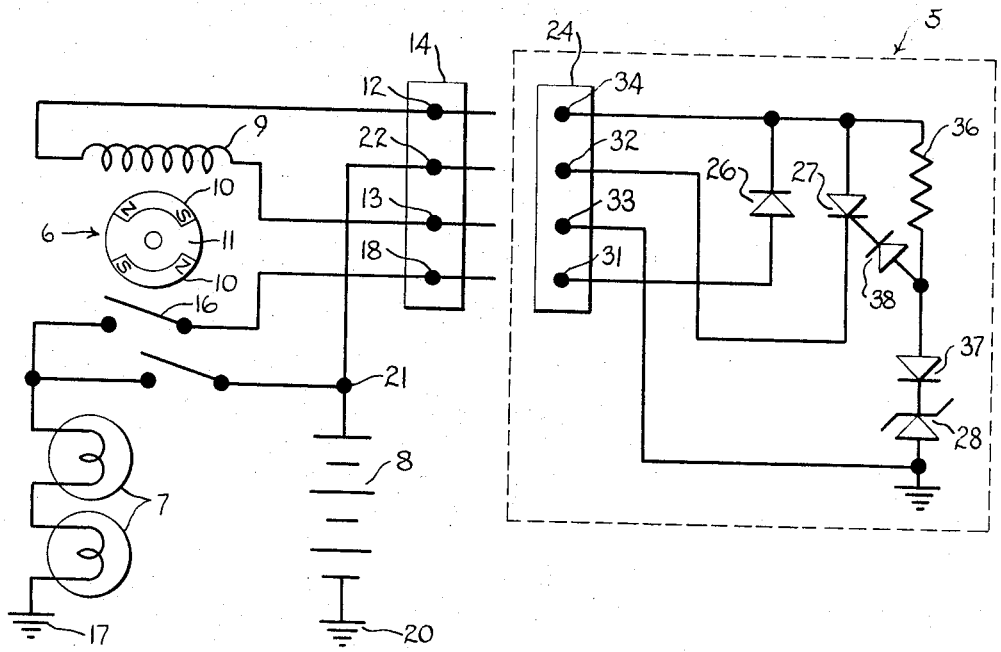
FIG. 1 is a schematic circuit diagram of the module of this invention.

Referring now to the accompanying drawings, and first considering FIG. 1, the module 5 of this invention is intended for cooperation with an electrical system that comprises an alternator 6, a load 7 (illustrated as electric lights) and a battery 8. The load and the battery have grounded terminals 17 and 20, respectively. The alternator has a winding 9 that cooperates with magnet means 10 carried for rotation by its rotor 11. Opposite ends of the winding 9 are connected with two of the terminals 12 and 13 of a plug connector 14 that has four terminals. In the case where a single module is used for half-wave rectification, a third terminal 22 of the plug connector is connected with the ungrounded terminal 21 of the battery 8, and the fourth terminal 18 of the connector is connectable with the ungrounded terminal of the load circuit through a manually controllable switch 16. In the present case the plug connector 14 is shown as a male one, but it will be understood that it is of a type that has a wall around its prong-like terminals to protect them and to guidingly embrace the body of a cooperating female connector plug.

The module 5 comprises a four-terminal plug connector 24 which can mate directly with the four-terminal plug 14, hence the plug connector 24 is here shown as a female one.

Where two of the modules 5 are used for full-wave rectification, in the arrangement disclosed in the aforesaid application Ser. No. 280,940, the connections of the load and the battery to the connector 14 are somewhat different, but nevertheless the alternator, load and battery can be connected with a plug connector identical with the connector 14 here shown, and each of the modules is identical in all respects with the module 5. The two modules that are in that case connected with one another and with the male plug corresponding to connector 14 by means of a three-plug harness. That harness is not shown here since all details of it are disclosed in said Ser. No. 280,940.

The module 5 comprises, in addition to the plug connector 24, a power diode 26, an SCR 27, a zener diode 28, a resistor 36 and two small diodes 37 and 38. These several components are mounted on a metal holder 50, which serves as a support for them pending their insertion into a pan-like container 51. The container is filled with a body 52 of potting material such as epoxy to secure and protectively encapsulate the components.

Considering the module structure in more detail, the power diode 26, as is conventional, has a cylindrical metal body 53 that serves as its cathode terminal, and has a fairly stiff wire 54 projecting concentrically from one end of its body that serves as its anode terminal. The SCR 27 conventionally has a cylindrical metal body 55 that serves as its anode terminal and has its gate and cathode terminals 56 and 57 projecting axially from one end of the body and formed to have solder connections made to them. The resistor 36, the zener diode 28 and the small diodes 37 and 38 are all likewise conventional components, each having wire terminal members projecting coaxially in opposite directions from a cylindrical body.

The metal holder 50, which can be made as an aluminum die casting, is an elongated platelike member with integral upwardly projecting bosses 58 and 59 at its opposite ends. Each of these bosses has a bore therethrough, said bores having their axes parallel to one another and transverse to the platelike medial portion of the holder. The SCR 27 is snugly received in the bore in the boss 58, while the power diode 26 is similarly received in the bore in the boss 59, both of those components having their axially extending terminal members projecting upwardly. The holder 50 thus serves to connect the cathode of the power diode with the anode of the SCR, serves as a heat sink for them, and mechanically secures them in fixed relation to one another.

The connector plug 24 has a body 60 that can be molded of a plastic insulating material, such as nylon. The plug body is relatively long and narrow and has four parallel bores 61 extending heightwise through it, from one of its narrow faces to the other, arranged in a row along its length. Each of the bores accommodates one of four identical plug-in terminal elements 31, 32, 33, 34. The terminal elements are preferably female ones, in the nature of small tubular plug jacks of a commercially available type, adapted to cooperate with snugly fitting pin-like male plug members. Each terminal element has radially projecting integral tangs 64 that are spaced from both ends of its tubular body portion. They permit the terminal element to be inserted axially into a bore 61 in the plug body from the rear end thereof, but once the element has been pushed all the way into the plug body, the tangs engage circumferential shoulders that are conventionally provided in the body, defined by different diameter portions of the bore 61, to confine the terminal element against axial displacement. At the rear of each terminal element there is an integral crimp connector 65 by which the terminal element can be secured to a conductor without solder, to make a good mechanical and electrical connection thereto. Each bore 61 in the plug body has a substantially enlarged diameter lower end portion to accommodate the crimp connector portion of its terminal element.

The crimp connector portion 65 of the terminal element 31 is secured to the upwardly projecting anode terminal 54 of the power diode 26, hence when that terminal element is thereafter inserted into the plug body 60, the plug body is established in a fixed relation to the power diode, and thus also to the holder 50, as well as to all of the other components, which are secured to that holder as will now be described.

To connect the resistor 36 with the holder 50, and hence with the anode of the SCR 27 and the cathode of the power diode 26, there is a threaded hole 62 in the wider boss 59 of the holder, parallel to the bore in that boss, to receive a connector screw 63. Crimped to one terminal of the resistor is an eyelet terminal 79 that is flatwise secured to the holder by means of the screw 63. The crimped connector of the eyelet terminal 79 also secures one end of a conductor wire 66, which has its other end crimp connected to the terminal element 34, thus connecting that terminal element with the anode of the SCR and the cathode of the power diode.

To the other terminal of the resistor 36 the anode terminals of the two small diodes 37 and 38 are connected and secured by means of a crimp connector 68. The cathode terminal of the small diode 38 has a solder connection to the gate terminal 56 of the SCR, but the components are here shown in their condition just before that solder connection is made. The cathode terminal of the other small diode 37 is connected directly to the cathode terminal of the zener diode 28 by means of another crimp connector 67. It will be noted that the connections just mentioned tend to establish the resistor, the zener diode and the small diodes 37 and 38 in more or less rigid relation to one another and to the holder 50.

The anode terminal of the zener diode 28 is connected with the terminal element 33 of the plug connector by means of the crimp connector 65 of that terminal element, to which there is also secured one end of another conductor wire 69. An eyelet connector 70 is crimped to the opposite end of the wire 69, for making a grounded connection to the container 51, as described below.

A third conductor wire 72 has at one of its ends a solder connection to the cathode terminal 57 of the SCR and has its other end crimp connected to the terminal member 32.

Note that the connections to the cathode and the gate terminals of the SCR 27 are the only soldered connections in the module, all others being crimped connections.

A short length of insulating sleeve is preferably slipped over each of the crimp connectors 67 and 68 to prevent them from coming into short circuiting contact with one another and with other conductors.

After the above described connections are made, the terminal elements 32, 33 and 34 on the conductor wires 72, 69 and 66 can be inserted into their proper bores 61 in the connector plug body 60, and then the plug body can be pushed down toward the holder 50 to force the terminal element 31 on the power diode anode into the fourth bore in the body, to thus establish the plug body in substantially a fixed position relative to the holder.

The container 51 is open at its top and can be rectangular in outline was viewed from above, with elongated side walls 73 and shorter end walls 74 projecting upwardly from its bottom wall 75. A pair of bosses 76 that are spaced from one another and from their adjacent corners of the container extend upwardly along one of the side walls, and a bore 78 through each of these bosses can receive a mounting screw (not shown) by which the container can be secured to the body of an engine or the chassis or a powered machine, in grounded connection therewith. One of such screws will secure the eyelet connector 70, to thus provide a grounded connection for the anode of the zener diode and the terminal element 33. To insure a good grounding connection, the container is preferably unpainted and is made of aluminum or the like, preferably as a die casting.

Figure 2:
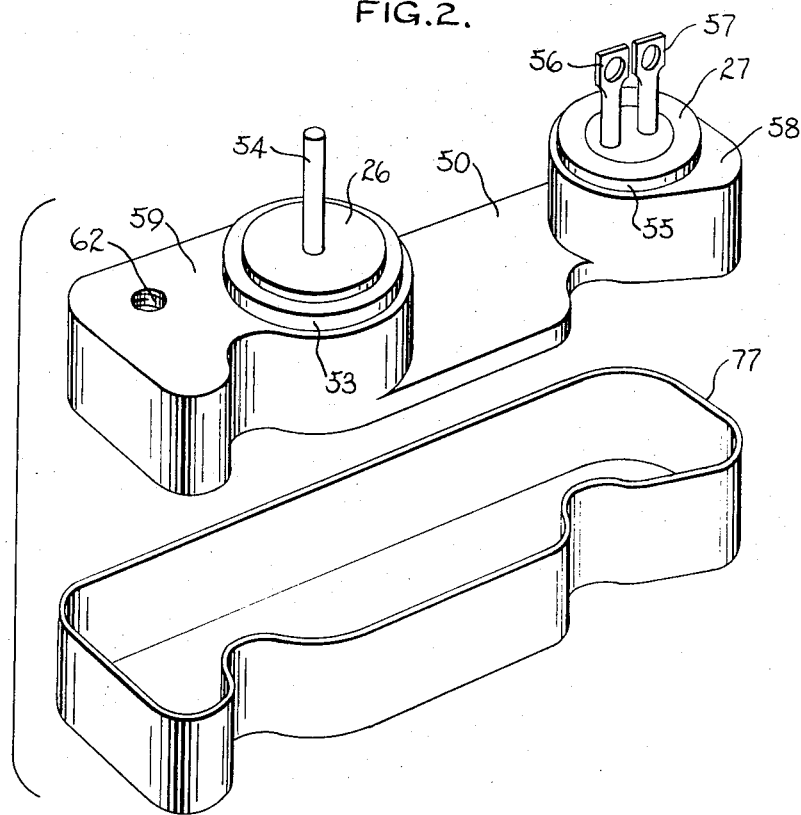
FIG. 2 is an exploded perspective view of the holder member of the module of this invention and an insulator therefor, with the SCR and power diode installed on the holder member in an early stage in the manufacture of the module.
Figure 3:
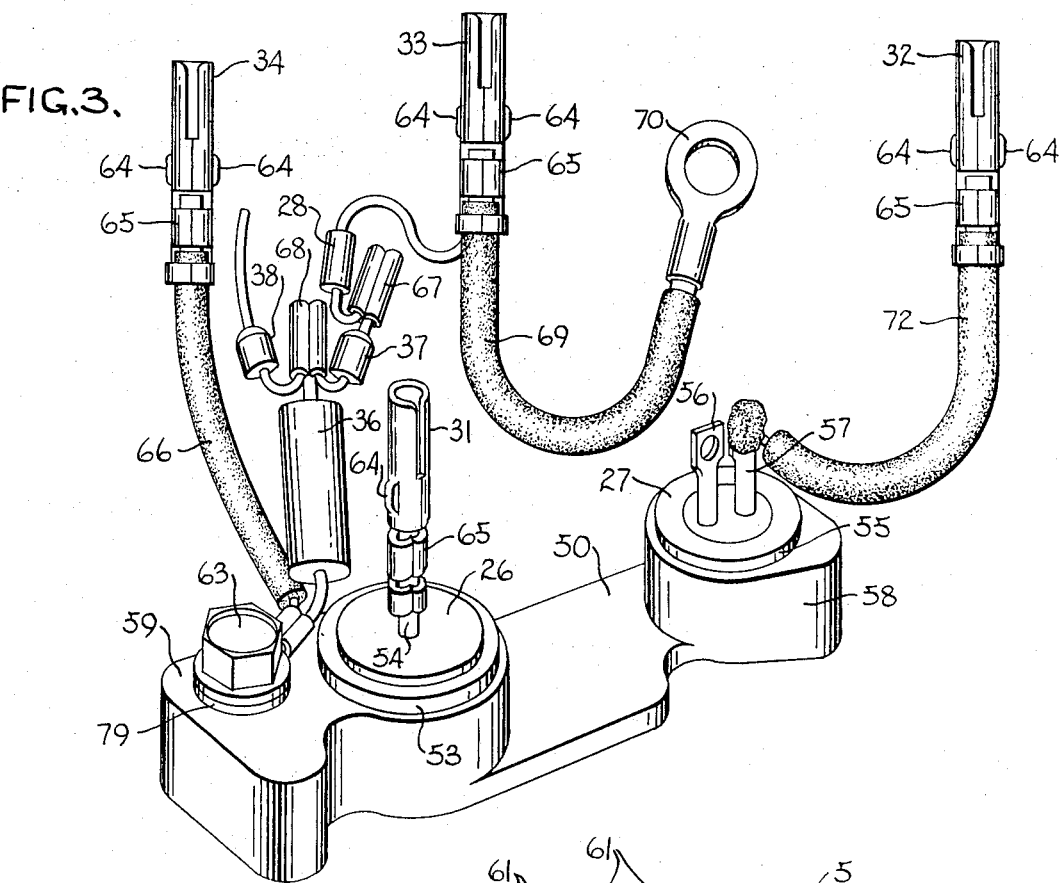
FIG. 3 is a perspective view of the assembled components of the module, shown in disassembled relation to the container member.
Figure 4:
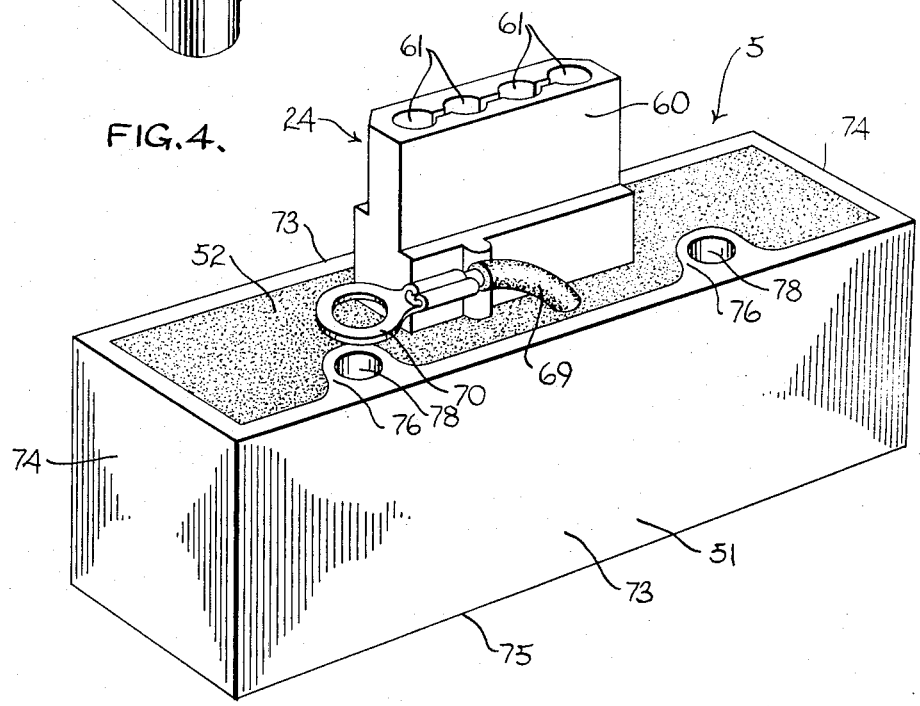
FIG. 4 is a perspective view of a finished module.

The holder 50 must be insulated from the container. The insulation material can be in the form of a small sheet of mylar or the like, tucked into the container to embrace the bottom and side surfaces of the holder, or it can take the form of a more or less pan-like molded part 77 (see FIG. 2) that snugly fits around the bottom portion of the holder 50 and can be slipped onto it just before it is inserted into the container 51.

With the several components assembled to the holder and the holder inserted into the container, the container is filled to the brim with a body 52 of hardenable liquid potting material such as epoxy. The plug connector body 60, being conventionally molded of a material such as nylon to which epoxy does not adhere, will ordinarily have laterally projecting lugs (not shown) near its bottom, at a level below the rim of the container, and by reason of these lugs being embedded in the potting material, the plug connector is held as rigidly as if it were integral with the container.

From the foregoing description taken with the accompanying drawings it will be apparent that this invention provides a very compact, extremely sturdy regulator-rectifier module that can be manufactured at low cost with a minimum of tooling.

Those skilled in the art will appreciate that the invention can be embodied in forms other than as herein disclosed for purposes of illustration.

The invention is defined by the following claims:

1. A regulator-rectifier module of the character described, comprising an SCR and a power diode arranged for alternate conduction and each of which has a conductive body that provides one of its terminals, a connector plug having four terminal members, and components comprising a resistor-zener diode regulating circuit connected with the gate terminal of the SCR and arranged to render the SCR conductive only at times when a charge must be impressed upon a battery that has one of its terminals connected with a terminal member of the connector plug, said module comprising:
   A. an outer container member;
   B. a metal holder received within the container member in insulated relation thereto and having wells in which the bodies of the SCR and the power diode are snugly received, the power diode being disposed with its other terminal projecting outwardly in the container member and the holder thus serving to electrically connect the bodies of the SCR and the power diode, mechanically fix them in relation to one another and serve as a heat sink for them;
   C. means directly connecting said other terminal of the power diode with a terminal member of the connector plug to thus fix the connector plug in relation to the holder; and
   D. a body of hardened insulating material in the container, fixing the holder in its interior in insulated relation to it, encapsulating said components and partially embedding the connector plug to secure it in fixed relation to the holder.

2. A regulator-rectifier module of the character described, comprising a connector plug having four terminal members, a power diode and an SCR arranged for alternate conduction and each of which has a conductive body that provides one of its terminals, and components comprising a resistor-zener diode regulating circuit connected with the gate terminal of the SCR and arranged to render the SCR conductive only at times when a charge must be impressed upon a battery that has one of its terminals connected with a terminal member of the connector plug and its other terminal grounded, said module comprising: 'A. an outer container member adapted to be grounded and thus connected with said other terminal of a battery;
   B. a metal holder received in said container member and which defines a pair of wells in which the bodies of the power diode and the SCR are snugly received with the other terminal of the power diode projecting outwardly of the container member, said holder thus electrically connecting the power diode and SCR, mechanically fixing them in relation to one another and serving as a heat sink for them;
   C. means mechanically and electrically connecting a terminal member of the plug connector directly to said other terminal of the power diode and thereby establishing the plug connector in substantially a fixed relation to the holder;
   D. crimped connector means mechanically and electrically connecting terminals of said components with a connector secured to said holder, with one another, and with a second terminal member of the connector plug;
   E. conductor means connecting a third terminal member of said connector plug with said connector means, the fourth terminal member of said connector plug with another terminal of the SCR, and said second terminal member of the connector plug with the outer container; and
   F. insulating means in the outer container securing the metal holder therein, in insulated relation thereto, securing the plug connector in fixed relation to the outer container and embedding said components and the SCR and power diode.

3. A regulator-rectifier module of the character described, comprising an SCR and a power diode arranged for alternate conduction and each of which has a conductive body that provides one of its terminals, and components comprising a resistor-zener diode regulating circuit connected with the gate terminal of the SCR and arranged to render the SCR conductive only at times when a charge must be impressed upon a battery that has its terminals connected with the components of the regulator-rectifier module, said module comprising:

A. an outer container member;

B. a metal holder received within the container member in insulated relation thereto and having wells in which the bodies of the SCR and the power diode are snugly received, the power diode being disposed with its other terminal projecting outwardly in the container member and the holder thus serving to electrically connect the bodies of the SCR and the power diode, mechanically fix them in relation to one another and serve as a heat sink for them;

C. crimped connector means mechanically and electrically connecting terminals of said components with a connector secured to said holder and with one another to fix them in relation to the holder and one another; and D. a body of hardened insulating material in the container, fixing the holder in its interior in insulated relation to it and encapsulating said components.

* * * * *